United States Patent
Wildschek et al.

(10) Patent No.: US 10,364,018 B2
(45) Date of Patent: Jul. 30, 2019

(54) COUPLING DEVICE, WING ASSEMBLY FOR AN AIRCRAFT COMPRISING SUCH COUPLING DEVICE AND AIRCRAFT COMPRISING SUCH WING ASSEMBLY

(71) Applicants: Airbus Defence and Space GmbH, Taufkirchen (DE); Airbus Group Limited, London (GB)

(72) Inventors: Andreas Wildschek, Riemerling (DE); Stefan Storm, Unterschleißhein (DE); Stephen Rolston, Bristol (GB); Martin Herring, Bristol (GB)

(73) Assignees: Airbus Defence and Space GmbH (DE); AIRBUS OPERATIONS LIMITED (GB)

( * ) Notice: Subject to any disclaimer, the term of this patent is extended or adjusted under 35 U.S.C. 154(b) by 388 days.

(21) Appl. No.: 15/213,636

(22) Filed: Jul. 19, 2016

(65) Prior Publication Data
US 2017/0021911 A1 Jan. 26, 2017

(30) Foreign Application Priority Data
Jul. 21, 2015 (EP) .................................... 15177687

(51) Int. Cl.
*B64C 3/38* (2006.01)
*B64C 3/42* (2006.01)
(Continued)

(52) U.S. Cl.
CPC ................. *B64C 3/38* (2013.01); *B64C 3/42* (2013.01); *B64C 3/56* (2013.01); *B64C 13/40* (2013.01);
(Continued)

(58) Field of Classification Search
CPC .. B64C 3/38; B64C 13/40; B64C 3/56; B64C 39/00; B64C 3/42; B64C 2039/105
See application file for complete search history.

(56) References Cited

U.S. PATENT DOCUMENTS 3,818,936 A * 6/1974 Jackoboice ............. F15B 13/01
  137/270
5,586,627 A * 12/1996 Nezu ...................... B60G 17/08
  188/266.6
(Continued)

FOREIGN PATENT DOCUMENTS

DE         4417796 A1   12/1994
DE  10 2010 005 887 B4  12/2013
(Continued)

OTHER PUBLICATIONS

EP 15 17 7687 Search Report (dated Jan. 22, 2016).

*Primary Examiner* — Assres H Woldemaryam
(74) *Attorney, Agent, or Firm* — Lerner, David, Littenberg, Krumholz & Mentlik, LLP

(57) ABSTRACT

A coupling device for supporting a first wing section against a second wing section of an aircraft, and configured for passive flight load alleviation includes a housing including a chamber including a first portion and a second portion and filled with a fluid, a piston device movably arranged in the chamber and separating the first portion from the second portion in a fluid tight manner, a first fluid pathway connecting the first portion to the second portion, a first pressure relief valve arranged in the first fluid pathway and blocking the first fluid pathway, if the pressure in the second portion is smaller than a first relief pressure and opening the first fluid pathway, if the pressure in the second portion is greater than the first relief pressure. In addition, the coupling device can be used to actuate the second wing section against the first wing section.

15 Claims, 5 Drawing Sheets

(51) Int. Cl.
*B64C 3/56* (2006.01)
*B64C 13/40* (2006.01)
*B64C 39/00* (2006.01)
*B64C 39/10* (2006.01)

(52) U.S. Cl.
CPC ........ *B64C 39/00* (2013.01); *B64C 2039/105* (2013.01)

(56) References Cited

U.S. PATENT DOCUMENTS

| | | | |
|---|---|---|---|
| 6,454,206 B2* | 9/2002 | Vincent | F16F 9/20 188/266.3 |
| 6,619,584 B1* | 9/2003 | Haynes | B60F 5/02 244/2 |
| 7,275,722 B2 | 10/2007 | Irving et al. | |
| 2001/0039470 A1* | 11/2001 | Fessler | F16H 61/66259 701/51 |
| 2006/0249340 A1* | 11/2006 | Love | B60N 2/42745 188/266.2 |
| 2007/0221054 A1* | 9/2007 | Webster | F15B 15/1409 91/394 |
| 2014/0345731 A1* | 11/2014 | Storm | F16K 31/56 137/627.5 |
| 2015/0184681 A1* | 7/2015 | Ogawa | F15B 11/17 92/82 |

FOREIGN PATENT DOCUMENTS

| | | |
|---|---|---|
| EP | 2 233 395 A1 | 9/2010 |
| EP | 2868931 A1 | 5/2015 |

* cited by examiner

COUPLING DEVICE, WING ASSEMBLY FOR AN AIRCRAFT COMPRISING SUCH COUPLING DEVICE AND AIRCRAFT COMPRISING SUCH WING ASSEMBLY

FIELD OF THE INVENTION

The invention refers to a coupling device for supporting a first component against a second component of an aircraft, wherein the first component and the second component are movable relative to each other and exposed to aerodynamic loads. The coupling device is configured for a passive flight load alleviation. In addition, the invention refers to a wing assembly for an aircraft that comprises a first wing section and a second wing section that is rotatably attached to the first wing section. Furthermore, the invention refers to an aircraft that comprises at least one wing assembly.

BACKGROUND OF THE INVENTION

Wings of aircrafts that have a large span width facilitate high fuel efficiency. Possible issues arising with very large wing spans may be associated with the structure of the wings as they become very heavy in order to be able to carry the wing bending loads caused by maneuvers and gusts. To this end, some wings are divided in a first wing section and a second wing section that are rotatable to each other. Spring systems are arranged between the first wing section and the second wing section in order to hold the wing sections straight in normal operation, i.e. the flight position. The spring systems may exhibit non-linear behavior.

U.S. Pat. No. 7,275,722 B2 shows a wing tip device that comprises a foldable wing tip for reducing the load on the wing.

DE 10 2010 005 887 B4 discloses a wing having a foldable winglet. The different parts of the winglets are supported by a mechanical spring for reducing the load on the wing. The spring may be linear or non-linear.

EP 2 233 395 A shows a winglet having an autonomously actuated tab. To this end, a mechanism is provided for actuating the different parts of the wings.

BRIEF SUMMARY OF THE INVENTION

An aspect of the invention may provide a system that allows passive flight load alleviation.

According to an embodiment of the invention, a coupling device for supporting a first component against a second component of an aircraft, wherein the first component and the second component are movable relative to each other and exposed to aerodynamic loads, is configured for passive flight load alleviation and comprises a housing comprising a chamber, a piston device, a first fluid pathway, and a first relief valve arranged in the first fluid pathway. The chamber comprises a first portion as well as a second portion and is filled with a fluid. The piston device is movably arranged in the chamber and separates the first portion from the second portion in a fluid-tight manner. The first fluid pathway connects the first portion to the second portion. The first pressure relief valve blocks the first fluid pathway, if the pressure in the second portion is smaller than a first relief pressure, and opens the first fluid pathway, if the pressure in the second portion is greater than the first relief pressure.

The first component and the second component can be any element of an aircraft that are exposed to aerodynamic loads; that is loads that vary in time. The second component can move against the first component if the coupling device is not present such that the coupling device supports the second component on the first component. The first component may be a first wing section of aircraft and/or the second component may be a second wing section of an aircraft.

The coupling device is preferably a hydraulic system for passive flight load alleviation. Further preferably, the coupling device constitutes a non-linear system for supporting a first wing section against a second wing section. In particular, the coupling device may exhibit in general a binary behavior: as long the first pressure relief valve is closed, the coupling device is approximately rigid; once the first pressure relief valve opens, the second wing section can move relative to the first wing section. The coupling device may be used instead of a non-linear mechanical spring of the prior art for passive flight load alleviation.

The second wing section is preferably rotatably attached to the first wing section, for example, by means of a hinge or a shaft. Hence, the second wing section may rotate freely against the first wing section around an axis if the coupling device is not provided.

It is preferred that an axis of the rotation of the hinge joining the first wing section to the second wing section is at an angle relative to the line of flight when viewed in the planform. This angle could cause the hinge position at the trailing edge of the wing to be further inboard than at the leading edge of the wing. Preferably, the angle is in a range from 20° to 40°.

The coupling device may hold the second wing section in a straight configuration with regard to the first wing section such that the first wing section and the second wing section form a straight wing. If the load on the second wing section in a first direction (for example a positive G load) exceeds a certain threshold, the coupling device allows the second wing section to rotate against the first wing section. A reduction in local incidence on the second wing section may reduce or reverse aerodynamic loads on the second wing section, alleviating attachment loads at the hinge and internal loads in the first wing section.

The chamber may be a separate element arranged in the housing. Preferably, the chamber is constituted by the housing such that the chamber and the housing constitute a unitary element. The fluid with which the chamber is filled is preferably non-compressible such as a liquid. Preferably, the chamber is completely filled with the liquid. The housing and/or the piston device can be made by a light-weight material such as aluminum or an adequate plastic material.

The chamber may include a volume that has the form of a cylinder. The piston device is arranged in the chamber and can move in the chamber. For example, the piston device is a round plate that is disposed in a radial direction of a cylinder-shaped chamber.

The piston device divides the chamber in a first portion and a second portion in such a way that liquid in the first portion cannot flow to the second portion within the chamber. The piston device may include seals in order to provide a fluid-tight separation between the first portion and the second portion.

The movement of the piston in a first direction may urge the fluid in the second portion to flow out of the second portion due to the fluid-tight arrangement of the piston device in the chamber. Similarly, the movement of the piston device in a second direction may urge the fluid in the first portion to flow out of the first portion.

The first fluid pathway connects the first portion to the second portion. The first fluid pathway may be constituted by a hose or pipe that connects the first portion and the second portion of the chamber. Preferably, the first fluid pathway is constituted by the housing. For example, the first fluid pathway may be a passage in the housing that connects the first portion of the chamber to the second portion of the chamber. More preferably, the chamber as well as the first fluid pathway are constituted by the housing such that the housing, the chamber, and the first fluid pathway are a single element.

The first pressure relief valve is arranged in the fluid pathway. The first pressure relief valve may be constituted by a blocking element and a preloading element. For example, the blocking element may be preloaded by the preloading element in a closing position in which the flow of fluid in the first fluid pathway is blocked. The preloading element may be a mechanical spring. The configuration of the blocking element and the design of the preloading element may be such that the blocking element is moved by the fluid pressure in the second portion, if the pressure in the second portion is greater that the first relief pressure. Preferably, the first pressure relief valve is a pressure relief valve as known in the prior art.

The first relief pressure preferably corresponds with the maximum load that is envisaged to act on the wing without damaging it. For example, the first relief pressure is set such that the first pressure relief valve opens if the load acting on the second wing section exceeds a load level that is considered to be safe for the wing.

If the load acting on the second wing section is below the load level, the pressure in the second portion of the chamber is below the first relief pressure and the first pressure relief valve is closed. Hence, fluid from the second portion cannot flow to the first portion such that the piston device is locked. Hence, the second wing section is in a fixed relationship with regard to the first wing section. If, however, the load level acting on the second wing section is above the predetermined load level, the pressure in the second chamber is above the first relief pressure such that the first pressure relief valve opens. In this case, fluid from the second portion can flow to the first portion such that the piston device can move within the chamber. The second wing section can move with regard to the first wing section such that excessive loads can be alleviated.

This configuration of the coupling device may reproduce the characteristics of a non-linear mechanical spring without including the disadvantages of a mechanical element such as wear and/or fatigue failure.

Preferably, the amount of fluid that can flow through the first fluid pathway allows a fast movement of the second wing section with regard to the first wing section. To this end, the diameter of the first fluid pathway may have a sufficient width.

An advantage of the invention is that the coupling device allows a sufficiently fast movement of the second wing section with regard to the first wing section in order to allow an almost instant alleviation of the load acting on the wing.

The coupling device may be arranged instead of a mechanical spring and in particular instead of a non-linear spring that is arranged between the first wing section and the second wing section according to the prior art. An advantage of the coupling device is that the non-linear capabilities of the coupling device may be achieved in a simpler fashion compared to a mechanical spring. Furthermore, the coupling device may have a reduced likelihood of fatigue failure compared to a mechanical spring.

It is preferred that the coupling device further comprises a first throttle element arranged in the first fluid pathway.

The first throttle element may constituted by a throttle and/or a restriction in the first fluid pathway. The first throttle element may change the orifice of the first fluid pathway. The first throttle element affects the damping capabilities of the coupling device. Hence, the first throttle element may be designed such that the damping of the coupling device is adapted to the configurations of the first wing section and the second wing section.

The first throttle element may be used to adjust the velocity with which the first wing section (or first component) may rotate (move) relative to the second wing section (or second component) once the first pressure relief valve opens. The effect of the first throttle element depends on the fluid resistance of the first throttle element and on the distance between the first throttle element and the first pressure relief valve.

The first throttle element can be configured such that the fluid resistance can be varied remotely. For example, the first throttle element is configured such that the diameter of the orifice of the first throttle element can be varied.

It is preferred that the coupling device further comprises a second fluid pathway connecting the first portion to the second portion, wherein preferably a second pressure relief valve is arranged in the second fluid pathway, wherein the second pressure relief valve blocks the second fluid pathway, if the pressure in the first portion is smaller than a second relief pressure and opens the second fluid pathway, if the pressure in the first portion is greater than the second relief pressure. Preferably, a second throttle element is arranged in the first fluid pathway.

Preferably, the coupling device according to this embodiment allows a load alleviation in two directions that are preferably opposite to each other. The first relief pressure may be the same as the second relief pressure. It is preferred that the first relief pressure and the second relief pressure differ. In this embodiment, the second wing section is allowed to move against the first wing section if the load acting on the second wing section is above a certain threshold regardless of direction of the load. Hence, the load in the second wing section may act from below or from above.

Preferably, the second fluid pathway may be constituted in a similar fashion than the first fluid pathway. Further preferably, the second pressure relief valve may be constituted similar as the first pressure relief valve. It is preferred that the second throttle element is constituted similar to the first throttle element. Hence, the descriptions and advantages described above may equally apply to the second fluid pathway and/or the second pressure relief valve and/or the second throttle element, respectively.

The second fluid pathway connects the first portion to the second portion. The second fluid pathway may be constituted by a hose or pipe that connects the first portion and the second portion of the chamber. Preferably, the second fluid pathway is constituted by the housing. For example, the second fluid pathway may be a passage in the housing that connects the first portion of the chamber to the second portion of the chamber. More preferably, the chamber as well as the second fluid pathway are constituted by the housing such that the housing, the chamber, and the second fluid pathway are a single element.

The second pressure relief valve may be constituted by a blocking element and a preloading element. For example, the blocking element may be preloaded by the preloading element in a closing position in which the flow of fluid in the second fluid pathway is blocked. The preloading element may be a mechanical spring. The configuration of the blocking element and the design of the preloading element may be such that the blocking element is moved by the fluid pressure in the first portion if the pressure in the first portion is greater than the second relief pressure. Preferably, the second pressure relief valve is a pressure relief valve as known in the prior art.

In an exemplary embodiment, at least two first pressure relief valves are arranged in the first fluid pathway in parallel, wherein the first relief pressures of each of the first relief pressure valves differ and wherein each first pressure relief valve can be remotely locked.

In an exemplary embodiment, at least two second pressure relief valves are arranged in the second fluid pathway in parallel, wherein the second relief pressures of each of the second relief pressure valves differ and wherein each second pressure relief valve can be remotely locked.

In an embodiment of the invention, two, three, four or more first pressure relief valves are arranged in the first fluid pathway in parallel. The first pressure relief valves are preferably arranged such that the opening of one of the first pressure relief valves opens the first fluid pathway.

In an embodiment of the invention, two, three, four or more second pressure relief valves are arranged in the second fluid pathway in parallel. The second pressure relief valves are preferably arranged such that the opening of one of the second pressure relief valves opens the second fluid pathway.

In an embodiment of the invention, the first and/or the second pressure relief valves can be individually locked. For example, the blocking element can be fixed by a fixing device. The fixing device can be moved between a releasing position in which the blocking element is preloaded by the preloading element and a fixing position in which the blocking element cannot move irrespective of the pressure acting on the blocking element. An actuator that may be remotely controlled preferably actuates the fixing element.

The relief pressure of the individual first and/or second relief pressure valves may be different. For example, the spring constants of the preloading element differ. Thus, in the releasing position of the fixing element, the individual first and/or second relief pressure valves open at different pressures.

In an exemplary embodiment of the invention, only one of the first and/or second relief pressure valves is not locked while the other of the first and/or second relief pressure valves are locked. Thus, the relief pressure of the unlocked first and/or second relief pressure valves determine the relief pressure of the coupling device. An advantage is that the relief pressure can be changed by selecting the appropriate one of the first and/or second relief pressure valves. Hence, the spring constant of coupling device can be changed during operation.

In an embodiment of the invention, the coupling device comprises at least two first throttle elements that are arranged in the first fluid pathway in parallel, wherein each first throttle element can be remotely blocked. In an embodiment, the fluid resistance of each of the first throttle elements differs.

In an embodiment of the invention, the coupling device comprises at least two second throttle elements that are arranged in the second fluid pathway in parallel, wherein each second throttle element can be remotely blocked. In an embodiment, the fluid resistance of each of the second throttle elements differs.

In an embodiment of the invention, two, three, four or more first throttle elements are arranged in the first fluid pathway in parallel. The first throttle elements are preferably arranged such that the first throttle elements that are open (not blocked) determine the fluid resistance of the first fluid pathway.

In an exemplary embodiment, two, three, four or more second throttle elements are arranged in the second fluid pathway in parallel. The second throttle elements are preferably arranged such that the second throttle elements that are open (not blocked) determine the fluid resistance of the second fluid pathway.

In an embodiment of the invention, the first and/or the second throttle elements can be individually blocked. For example, a shutting element can block the one or more of the first and/or second throttle elements such that fluid can no longer flow through the blocked first and/or second throttle elements. An actuator that may be remotely controlled preferably actuates the shutting element.

The fluid resistance of the individual first and/or second throttle elements may be different. For example, the orifice and/or the length of the individual throttle elements differ. Thus, fluid resistance of the first fluid pathway and/or the second fluid pathway may be remotely controlled by blocking one or more of the first and/or throttle elements, respectively.

In an embodiment of the invention, the coupling device further comprises a third fluid pathway that connects the first portion to a first opening and a first check valve that is arranged in the third pathway.

In an exemplary embodiment, the first opening is arranged in the housing. The first opening may serve to insert fluid to the first portion of the chamber via the third pathway. To this end, a pump to be described later can be used. Furthermore, a pressure sensor can be provided in the third fluid pathway which can be used to check whether a sufficient amount of fluid is filled in the housing. The first check valve is configured to open or close the third pathway in an embodiment of the invention. The first check valve is in a closed position in an operating state such that the fluid in the chamber may only flow via the first fluid pathway and/or the second fluid pathway in an embodiment of the invention. Hence, in an operating state of the coupling device, the alleviation of loads acting on the wing is enabled. In an embodiment of the invention, the first check valve is a check valve as known from the prior art.

In an exemplary embodiment of the invention, the coupling device further comprises a fourth fluid pathway that connects the second portion to a second opening and a second check valve that is arranged in the fourth pathway.

In an embodiment of the invention, the second opening is arranged in the housing. The second opening may serve to insert fluid to the second portion of the chamber via the fourth pathway. The second check valve is configured to open or close the fourth pathway in an embodiment.

In an exemplary embodiment, the second check valve is in a closed position in an operating state such that the fluid in the chamber may only flow via the first fluid pathway and/or the second fluid pathway. Hence, in an operating state of the coupling device, the alleviation of loads acting on the wing is enabled. In an embodiment, the second check valve is a check valve as known from the prior art.

In an embodiment of the invention, the coupling device further comprises a first actuator configured to actuate the first check valve and/or a second actuator configured to actuate the second check valve.

The first actuator and/or the second actuator may actuate the first check valve and/or the second check valve, respectively. The first actuator and/or the second actuator may be an electrical motor that moves a blocking element of the first check valve and/or the second check valve, respectively. The provision of the first actuator and/or the second actuator may facilitate remote control of the coupling device.

The first check valve and/or the second check valve may comprise a blocking element that can be moved between a closing position and an opening position. In the closing position, the blocking element is arranged in the third fluid pathway and/or the fourth fluid pathway, respectively, such that the third fluid pathway and/or the fourth fluid pathway is blocked. Hence, no fluid can flow in the third fluid pathway and/or the fourth fluid pathway if the blocking element is in the closing position. In the opening position, the blocking element is positioned such that fluid can flow in the third fluid pathway and/or the fourth fluid pathway, respectively.

The actuator may comprise a cam that is arranged on a shaft. The cam may abut against the blocking element. If the shaft rotates, the cam is moved such that the blocking element is moved to the opening position. In an embodiment of the invention, a preloading element such as a spring preloads the blocking element to the closing position such that the blocking element is moved to the opening position by the actuation of the actuator. Alternatively, a connecting element is arranged between the blocking element and the cam. The connecting element may allow a fluid-tight separation of the blocking element and the cam.

In an embodiment of the invention, the coupling device further comprises a first attachment portion for attaching the housing to the first wing section and/or a second attachment portion for attaching the piston to the second wing section.

For example, the first attachment portion attaches the housing of the coupling device to an axle or shaft that is attached to the first wing section.

The first attachment portion may mount the coupling device to the first wing section.

The second attachment portion may provide a connection between the piston device and the second wing section. For example, the second attachment portion may be constituted by a rod. The rod may be movably arranged in an opening of the chamber such that the movement of the piston device moves the rod which in turn moves the second wing section. The opening of the chamber may comprise an opening in the housing.

In an embodiment of the invention, the coupling device further comprises a first bearing attached to a free end of the first attachment portion for rotatably attaching the first attachment portion to the first wing section and/or a second bearing attached to a free end section of the second attachment portion for rotatably attaching the second attachment portion to the second wing section.

In an embodiment of the invention, the first bearing connects an axle of the first wing section with the first attachment portion. This allows a rotation of the coupling device with regard to the first wing section. In an embodiment, the second bearing is attached at a free end of the rod of the second attachment portion. Hence, the rod is rotatably attached to the second wing section. For example, the first bearing and/or the second bearing is a ball bearing.

In an embodiment of the invention, the coupling device further comprises a position sensor for measuring the position of the piston device in the chamber.

The position sensor may be configured to measure the movement of the rod with regard to the chamber and/or the housing. Alternatively, the position sensor measures the movement of the piston device. The position sensor may comprise a measuring rod that is fixed to one end of the chamber. The other end of the measuring rod is arranged in an opening of the piston device. A sensor is arranged at the piston device in order to measure the movement of the piston device relative to the measuring rod.

The provision of the position sensor may allow determining the position of the piston device in the chamber which corresponds to the relative position of the second wing section with regard to the first wing section. Hence, the position of the second wing section with regard to the first wing section can be determined.

In an embodiment of the invention, the coupling device further comprises a fluid pump for pumping fluid to the third fluid pathway and/or the fourth fluid pathway.

In one embodiment, the fluid pump can pump fluid with high pressure. By pumping fluid to the third fluid pathway and/or the fourth fluid pathway, fluid is pumped to the first portion and/or the second portion, respectively. In this way, the piston device can be moved within the chamber leading to a rotation of the second wing section with regard to the first wing section. When the fluid pump is pumping, the first check valve and/or the second check valve preferably is in the opening position.

The pumping of the fluid pump allows moving the second wing section back to its straight position with regard to the first wing section after the first pressure relief valve and/or the second pressure relief valve has opened and the second wing section moved with regard to the first wing section. Hence, the fluid pump is provided for moving back the second wing section to the straight position with regard to the first wing section. Thus, the fluid pump may be alternatively or additionally arranged to a spring preloading the second wing section into a straight position with regard to the first wing section.

A further advantage of the provision of the fluid pump is that the fluid pump may actuate the coupling device for rotating the second wing section with regard to the first wing section. This may allow to fold the second wing section with regard to the first wing section in order to reduce the wing span. This may beneficial if the air-craft is moving on ground in an airport that only allows a certain wing span.

Another advantage of the provision of the fluid pump is that the fluid pump may be used to check before take-off whether the coupling device is properly functioning. For example, the fluid pump can be used to check whether enough fluid is present in the coupling device.

In an embodiment of the invention, in a flying wing or blended wing body airplane, the first wing section and the second wing section can be arranged in a position perpendicular to each other such that the wing has a C-wing configuration which is beneficial for take-off and landing. While cruising, the wing has a straight configuration. The change between these two configurations is achieved by the pumping of the fluid pump.

The invention further relates to a wing assembly for an aircraft that comprises a first wing section, a second wing section that is rotatably attached to the first wing section, and a coupling device as described above that supports the second wing section with regard to the first wing section.

The configurations and advantages described above equally apply to the wing assembly.

Alternatively, an actuator for moving the third wing section against the second wing section can be arranged instead of the coupling device. For example, the coupling device between the second wing section and the third wing section is controlled such that the coupling device is only used for actuating the third wing section such as by permanently opening the first pressure relief valve and/or the second pressure relief valve.

In an embodiment, the wing assembly further comprises a first support element arranged at the first wing section for being connected to the first bearing and/or a second support element arranged at the second wing section for being connected to the second bearing.

The first support element and/or the second support element may be each constituted by an axle or shaft. In an embodiment, the first support element and/or the second support element are spaced apart to the hinge or shaft at which the first wing section is rotatably connected to the second wing section.

In an exemplary embodiment, the wing assembly further comprises a third wing section that is rotatably attached to the second wing section and a second coupling device as described above that supports the third wing section with regard to the second wing section.

Thus, the wing may comprise three wing sections that allow that the wing can form a straight configuration and a C-configuration as described above. The second coupling device is identical to the first coupling device in an embodiment.

The invention further relates to an aircraft comprising at least one wing assembly as described above.

The configurations and advantages as described above with regard to the coupling device and the wing assembly equally apply to the aircraft.

In an exemplary embodiment, the aircraft is a blended wing body aircraft. A blended wing body aircraft or flying wing is characterized in that the fuselage of the aircraft is formed as a part of the wing. Blended wing body aircrafts often have a large wing span such that excessive loads are applied to the wing. Thus, the provision of a wing assembly the wing sections of which are coupled by the coupling device according to the invention provides the preferred alleviation of loads. In addition, the provision of the coupling device allows to reduce the wing span during landing and take-off or during travelling in the airport.

BRIEF DESCRIPTION OF THE DRAWINGS

An embodiment of the invention is described in conjunction with the attached drawings in which.

DETAILED DESCRIPTION

Figure 1:
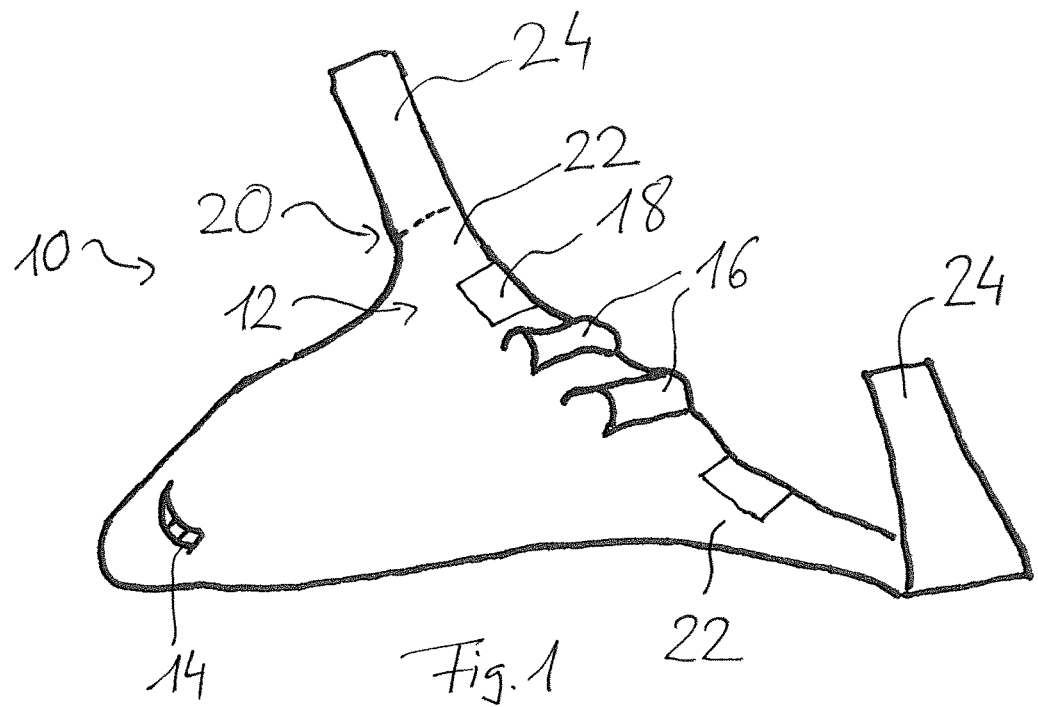
FIG. 1 shows a blended wing aircraft in a folded wing configuration.

FIG. 1 shows an aircraft 10. The aircraft 10 is a blended wing body aircraft. The air-craft 10 comprises a wing 12, a cockpit 14 and jet engines 16. The cockpit 14 is arranged in a middle part of the wing 12. The jet engines 16 are also arranged in the middle part of the wing 12. The wing also comprises two elevators 18.

Figure 2:
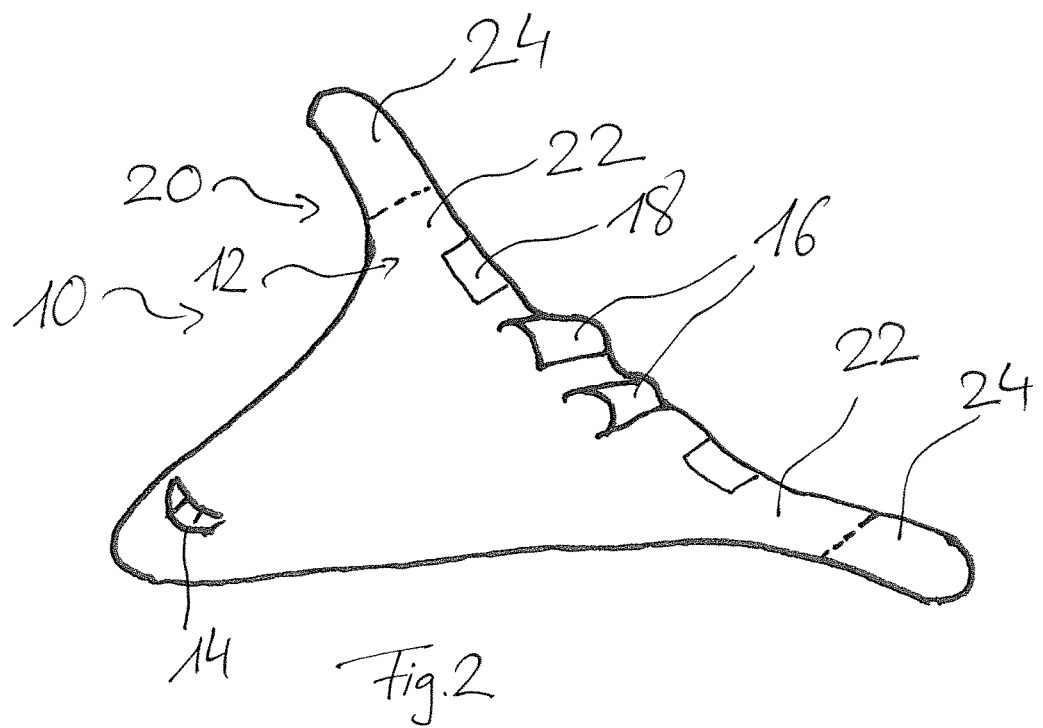
FIG. 2 shows a blended wing body aircraft having a straight configuration of the wing.

The wing 12 further comprises a wing assembly 20 including a first component 21, a first wing section 22, and a second component 23, a second wing section 24. The second wing section 24 can rotate with regard to the first wing section 22 by means of a hinge 26. In FIG. 1, the second wing section 24 is folded with regard to the first wing section 22. In FIG. 2, the first wing section 22 and the second wing section 24 are in a straight configuration.

Figure 3:
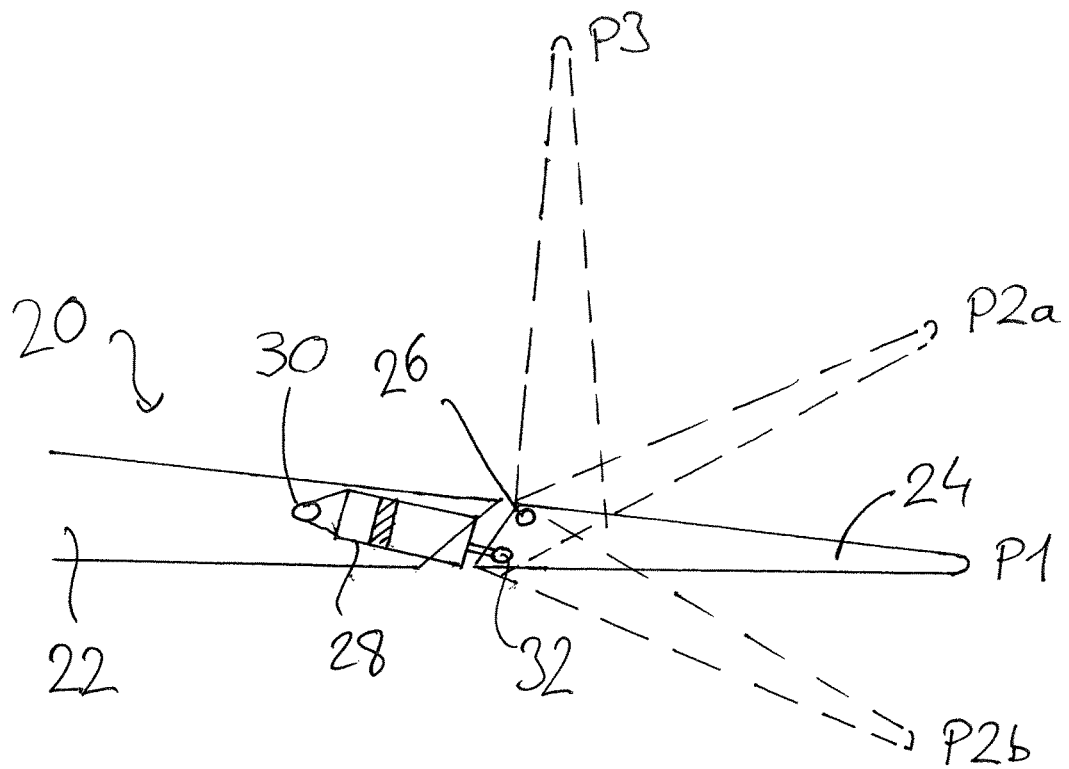
FIG. 3 shows an enlarged schematical representation of a wing assembly.

FIG. 3 shows an enlarged representation of the wing section 20. The second wing section 24 is rotatably attached to the first wing section 22 by means of the hinge 26. Hence, the second wing section 24 can rotate with regard to the first wing section 22 around the axis of the hinge 26.

A coupling device 28 is coupled between the first wing section 22 and the second wing section 24. The coupling device 28 is provided for fixing the position of the second wing section 24 with regard to the first wing section 22. The coupling device 28 is attached to the first wing section 22 by means of a first support element 30. The coupling element 28 is attached to the second wing element 24 by means of a second support element 32. The first support element 30 and the second support element 32 are constituted by a shaft. The coupling device 28 is rotatably attached to the first support element 30 and the second support element 32.

The coupling device 28 determines the position of the second wing section 24 with regard to the first wing section 22. While cruising, the second wing section 24 is in a straight configuration with regard to the first wing section 22 as indicated by the solid representation of the second wing section 24 (position P1). The coupling device is configured to alleviate loads that act on the second wing section. If a load acts of a certain magnitude on the second wing section 24 from above (positive G load), the coupling device 28 enables the clockwise rotation of the second wing section 24 to position P2b. If a load acts of a certain magnitude on the second wing section 24 from below (negative G load), the coupling device 28 enables the anti-clockwise rotation of the second wing section 24 to position P2a.

Furthermore, the coupling device is configured to move the second wing section 24 with regard to the first wing section 22. For example, the second wing section 24 can be moved from the straight configuration (position P1) to a folded configuration (parking configuration) as indicated in FIG. 3 by position P3.

Figure 4:
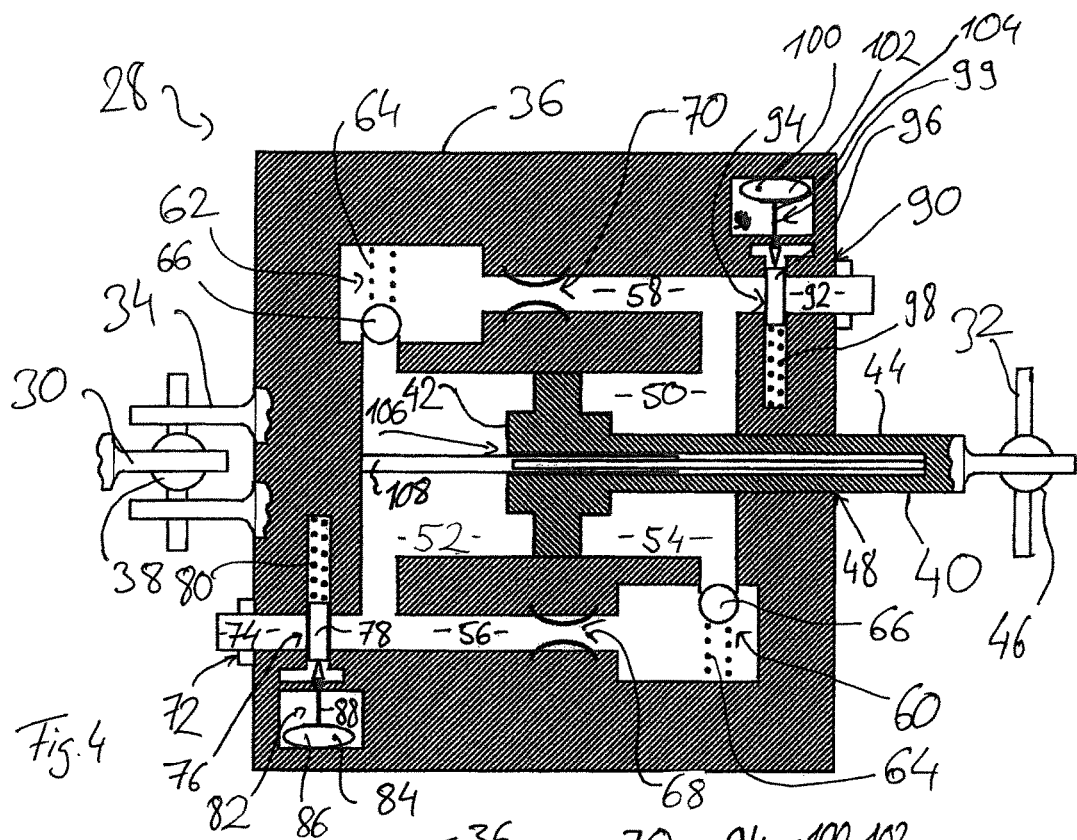
FIG. 4 shows a coupling device in a locked position.

As seen from FIG. 4, the coupling device 28 is attached to the first support element 30 by means of a first attachment portion 34. The first attachment portion 34 is attached to a housing 36 of the coupling device 28. The first attachment portion 34 is rotatably attached to the first support element 30 by means of a first bearing 38. The first bearing 38 is a ball bearing such that the first attachment portion 34 can rotate with regard to the first support element 30.

A second attachment portion 40 connects the second support element 32 with a piston device 42 of the coupling device 28. The second attachment portion 40 is constituted by a rod 44. The second attachment portion 40 is rotatably attached with regard to the second support element 32 by means of a second bearing 46. The second bearing 46 is a ball bearing such that the second attachment portion 40 can rotate with regard to the second support element 32. The rod 44 is arranged in a rod opening 48 of the housing 36. The rod 44 can move in the rod opening 48. The rod 44 is fixed to the piston device 42 such that a movement of the piston device 22 leads to a movement of the rod 44.

The coupling device 28 comprises the housing 36 and a chamber 50 in which the piston device 42 is arranged. The piston device 42 divides the chamber 50 into a first portion 52 and a second portion 54 in a fluid-tight manner. The first portion 52 and the second portion 54 are connected by a first fluid pathway 56 and a second fluid pathway 58. The first fluid pathway 56 and the second fluid pathway 58 are constituted by the housing 36. Similarly, the chamber 50 is constituted by the housing 36.

A first pressure relief valve 60 is arranged in the first fluid pathway 56. A second pressure relief valve 62 is arranged in the second fluid pathway 58. The first pressure relief valve 60 and the second pressure relief valve 62 comprise a preloading element 64 and a blocking element 66. The preloading element 64 is a mechanical spring that preloads the blocking element 66—in the present configuration a ball—in an opening of the fluid pathways 56 and 58, respectively.

Figure 5:
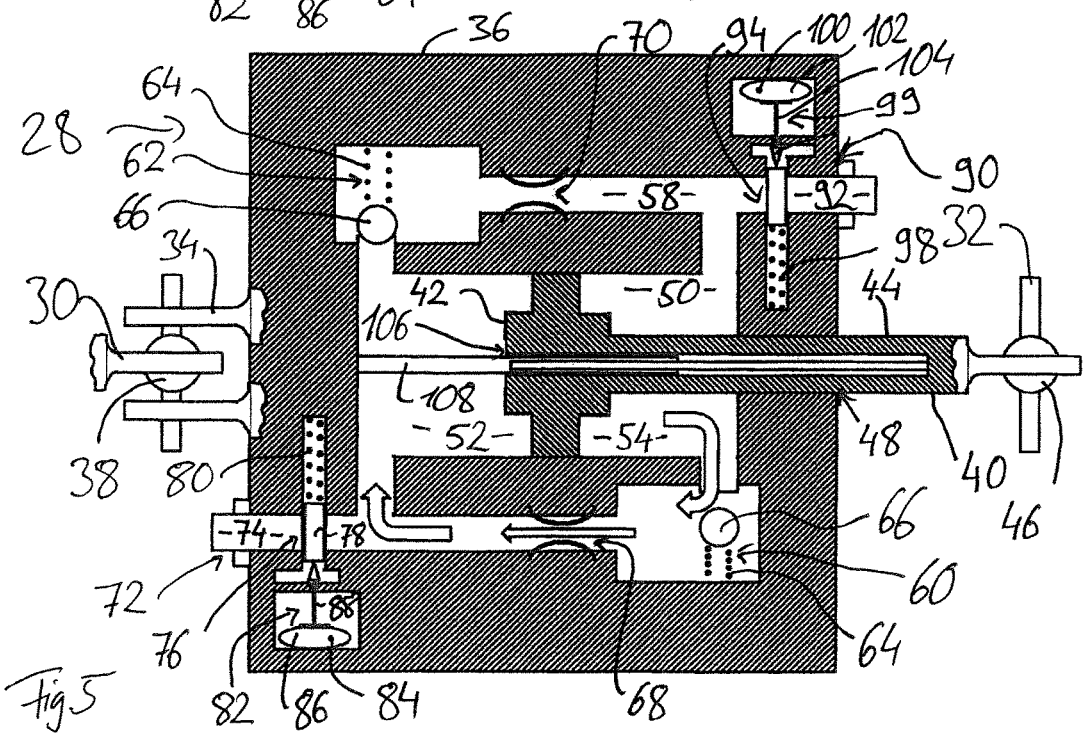
FIG. 5 shows the coupling device in an open position.

The first pressure relief valve 60 is configured such that it blocks the first fluid path-way 56 if the pressure in the second portion 54 is below a first relief pressure and it opens the first fluid pathway 56 if the pressure in the second portion 54 is above the first relief pressure. In this case, fluid can flow from the second portion 54 to the first portion 52 via the first fluid pathway 56 as depicted in FIG. 5. The piston device 42 then moves as indicated by the arrow in FIG. 5.

The second pressure relief valve 62 is configured such that it blocks the second fluid pathway 58 if the pressure in the first portion 52 is below a second relief pressure. If the pressure in the first portion 52 is greater than the second relief pressure, the second relief valve 62 opens and fluid can flow from the first portion 52 to the second portion 54 via the second fluid pathway 58. The first relief pressure may be the same as the second relief pressure.

A first throttle element 68 is arranged in the first fluid pathway 56. The first throttle element 68 is constituted by a throttle. A second throttle element 70 is arranged in the second fluid pathway 58. The second throttle element 70 is constituted by a throttle.

The coupling device 28 further comprises a first opening 72 that is arranged in the housing 36. The first opening 72 is connected to the first portion 52 of the chamber 50 by a third fluid pathway 74. A first check valve 76 is arranged in the third pathway 74. The first check valve 76 comprises a first check valve blocking member 78 and a first check valve preloading element 80. The first check valve blocking element 78 is movably arranged between an opening position and a closing position; the latter is shown in FIGS. 4 and 5. The third fluid pathway 74 is blocked in the closing position. The first check valve preloading element 80 preloads the first check valve blocking element 78 in the closing position.

The first check valve 76 further comprises a first actuator 82 that actuates the first check valve blocking element 78. The first actuator comprises a first shaft 84, a first cam 86, and a first connecting element 88. Due to the movement of the first shaft 84, the first cam 86 moves the first connecting element 88 which in turn moves the first check valve blocking element 78 against the spring force of the first check valve preloading element 80. By using the first connecting element 88, the first check valve blocking element 78 can be separated from the first cam 86 in a fluid tight manner.

The coupling device 28 further comprises a second opening 90 that is arranged in the housing 36. The second opening 90 is connected to the second portion 54 of the chamber 50 by a fourth fluid pathway 92. A second check valve 94 is arranged in the fourth pathway 92. The second check valve 94 comprises a second check valve blocking member 96 and a second check valve preloading element 98.

The second check valve blocking element 96 is movably arranged between an opening position and a closing position, the latter is shown in FIGS. 4 and 5. The fourth fluid pathway 92 is blocked in the closing position. The second check valve preloading element 98 preloads the second check valve blocking element 96 in the closing position.

The second check valve 94 further comprises a second actuator 99 that actuates the second check valve blocking element 96. The second actuator 99 comprises a second shaft 100, a second cam 102 and a second connecting element 104. Due to the movement of the second shaft 100, the second cam 102 moves the second connecting element 104 which in turn moves the second check valve blocking element 96 against the spring force of the second check valve preloading element 98. By using the second connecting element 104, the second check valve blocking element 96 can be separated from the second cam 102 in a fluid tight manner.

A fluid pump that is not shown in the figures is connected to the first opening 72 and the second opening 90. Upon activation of the fluid pump, the first check valve 76 and the second check valve 94 are moved into the opening position such that fluid can be pumped to the first portion 52 and/or the second portion 54, respectively. Due to the actuation of the fluid pump, the piston device 42 can be moved within the chamber 50 such that the second wing section 24 can be rotated with regard to the first wing section 22.

The coupling device 28 further comprises a position sensor 106. The position sensor 106 measures the position of the piston device 42 in the chamber 50. The position sensor 106 is arranged on the piston device 42. The position of the piston device 42 is measured in relation to a measuring rod 108 that is housed in the rod 44.

In the chamber 50, two stoppers 120 are provided that limit the movement of the piston device 42. The stoppers 120 may be made as an unitarian element with the housing 36. Since the stoppers 120 define the distance over which the piston device 42 can move, the stoppers 120 define the amount with which the second wing section 24 can be rotated against the first wing section 22.

Figure 8:
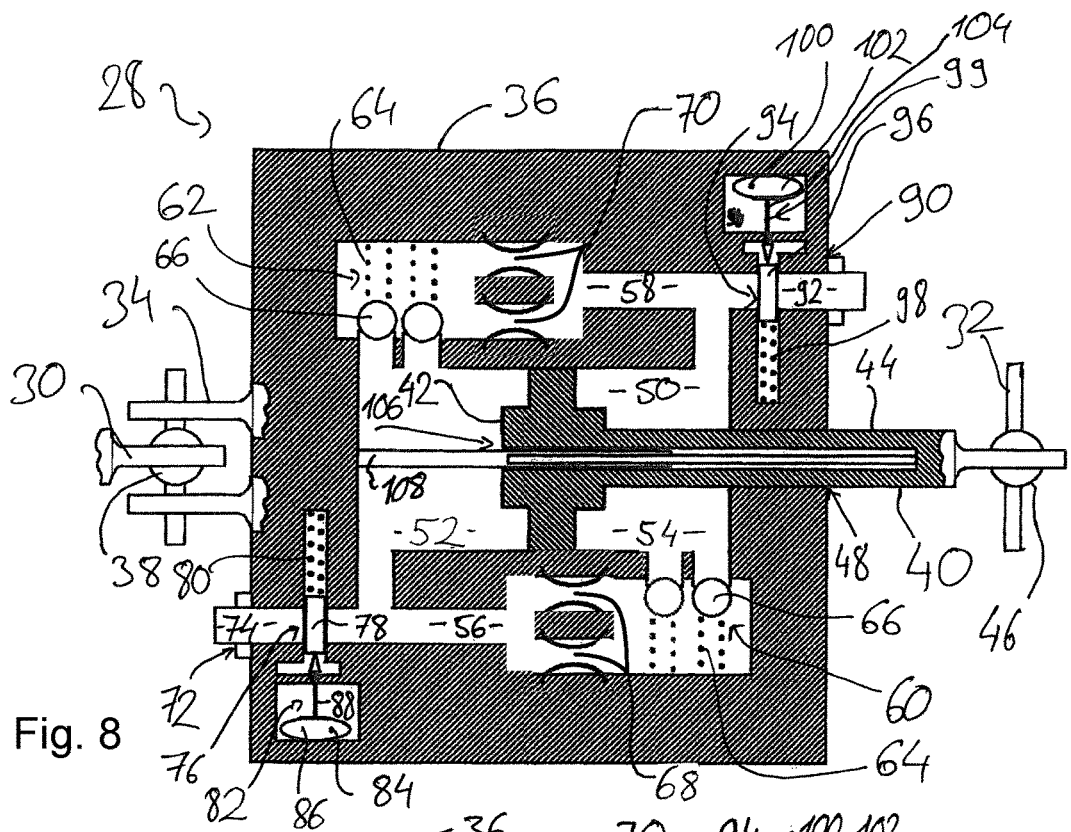
FIG. 8 shows an alternative embodiment of a coupling device in a locked position.
Figure 9:
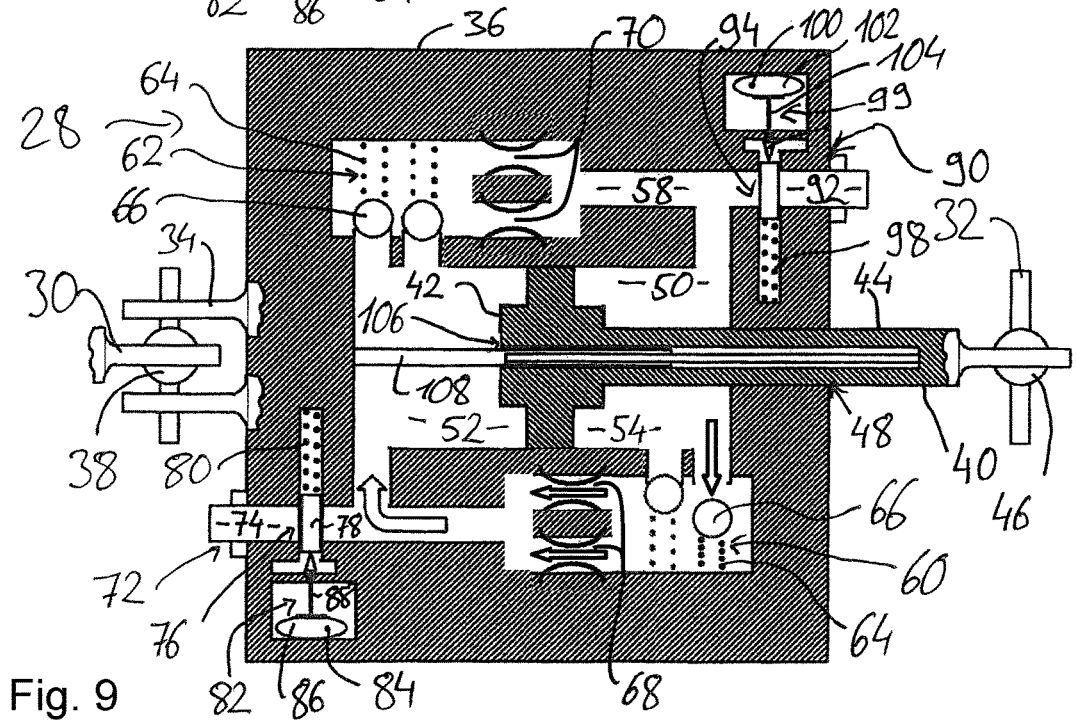
FIG. 9 shows the coupling device of FIG. 8 in an open position.

In an alternative embodiment shown in the FIGS. 8 and 9, at least two pressure relief valves 60, 62 are arranged in parallel in the first fluid pathway 56 and the second fluid pathway 58, respectively. The pressure relief valves 60, 62 can be remotely locked. At least two throttle elements 68, 70 are arranged in parallel in the first fluid pathway 56 and the second fluid pathway 58, respectively. The throttle elements 68, 70 can be remotely blocked.

Figure 6:
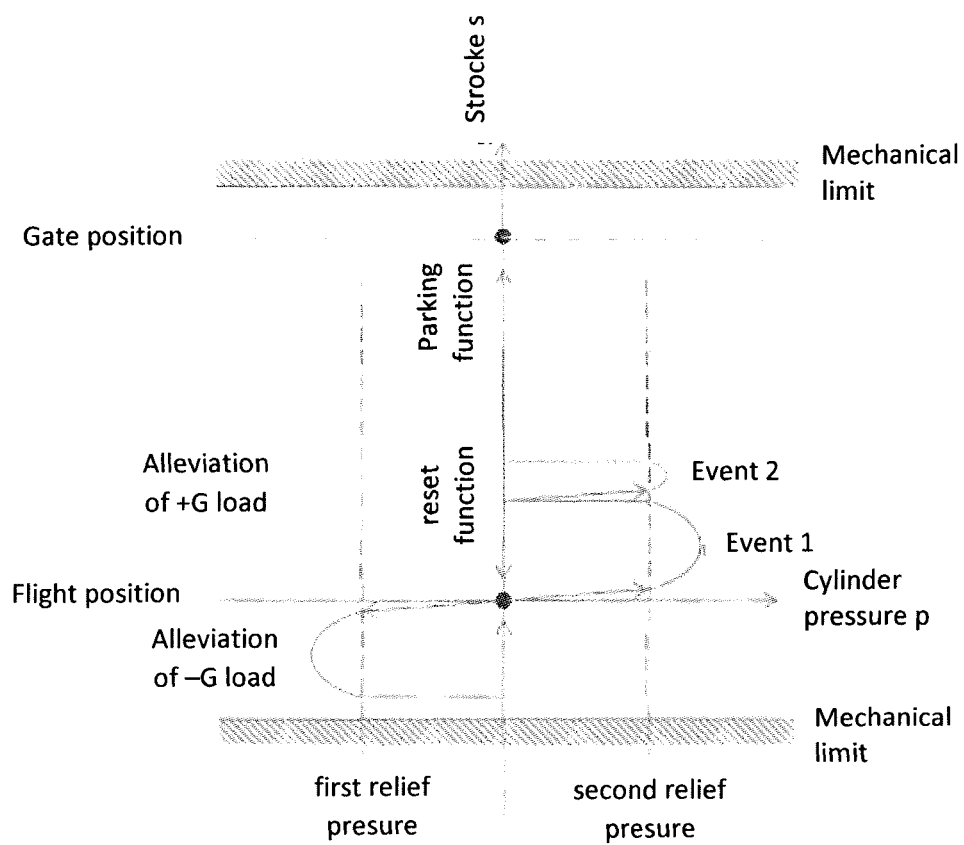
FIG. 6 shows a diagram illustrating the functioning of the coupling device.

The functioning of the coupling device 28 is schematically shown in FIG. 6. The pressure in the chamber 50 is depicted on the X-axis. If the pressure in the second portion 54 increases due to a load acting on the second wing section 24 (indicated in FIG. 6 as "Event 1"), the first pressure relief valve 60 remains in the blocking position until the first relief pressure indicated by the dashed line is attained. At this point, the first pressure relief valve 60 opens such that fluid from the second portion 54 can flow to the first portion 52 via the first fluid pathway 56. In this case, the piston 42 moves as can be seen in FIG. 6 as the stroke along the Y-axis. After a certain amount of fluid has flown from the second portion 54 to the first portion 52, the pressure in the second portion 54 decreases until the pressure returns to the first relief pressure. At this point, the first pressure relief valve 60 closes again such that the stroke of the piston device 42 does not change further. The amount of fluid that flows through the first fluid pathway 56 is adjusted by the first throttle element 70. In this way, the damping characteristics of the coupling device 28 and the velocity of the rotation of the second wing section 24 can be determined.

If a second load acts on the second wing section 24 (indicated in FIG. 6 as "Event 2"), a similar behavior occurs. In order to bring the piston device 42 back to its normal position, i.e. the straight configuration of the second wing section 24 with regard to the first wing section (labeled as "flight position" in FIG. 6), the pump is activated and the first check valve 76 and the second check valve 90 are opened such that fluid can be pumped in the second portion 54 for positioning the piston device 42 at stroke length 0.

If a load acts on the second wing section in the opposite direction as discussed above, a behavior as shown in FIG. 6 labeled "alleviation of –G" load applies which is opposite to the above described behavior.

In order to fold the second wing section 24 with regard to the first wing section 22, the first check valve 76 and the second check valve 94 are opened and the fluid pump is actuated in order to move the piston 42 to its maximum stroke that is once the piston device 42 abuts against the stopper 120. At this position, the second wing section 24 is perpendicular to the first wing section 22 which is labeled "Gate position" in FIG. 6.

Figure 7:
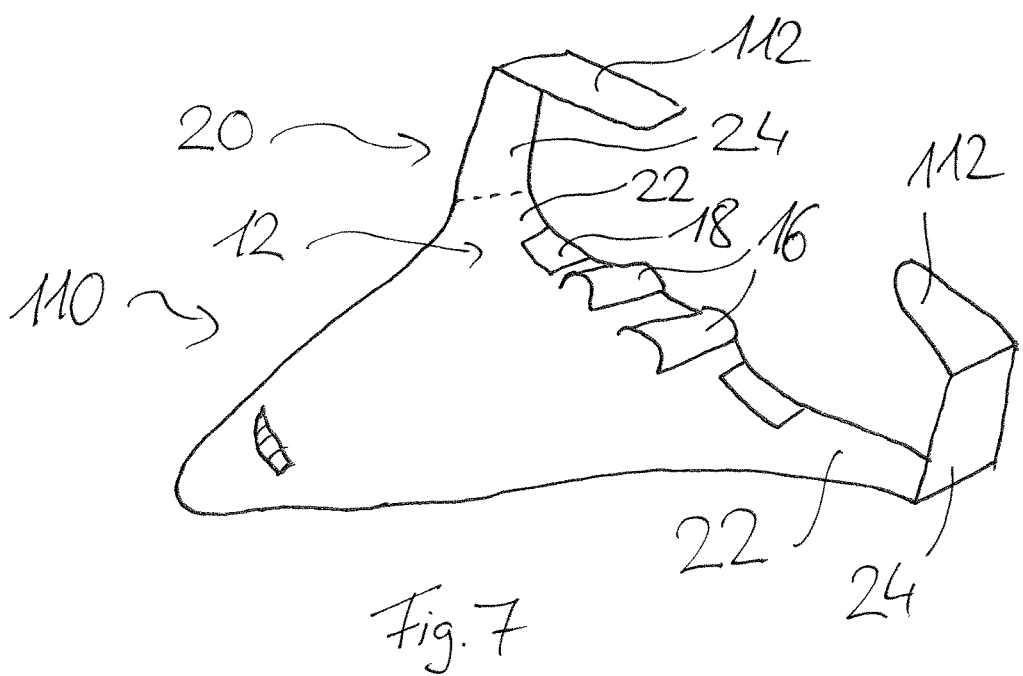
FIG. 7 shows an alternative blended wing body aircraft in a C-configuration of the wing.

FIG. 7 shows an alternative embodiment of an aircraft 110. The aircraft 10 according to FIG. 1 and the aircraft 110 are identical except for the following features. The wing assembly 20 comprises a first wing section 22, a second wing section 24 and a third wing section 112. The second wing section 24 is rotatable with regard to the first wing section 22. The third wing section 112 is rotatable with regard to the second wing section 24. In order to alleviate loads on the wing 12 and in order to position the second wing section 24 and the third wing section 112, a first coupling device 28 is provided between the first wing section 22 and the second wing section 24 as well as a second coupling device 28 is provided between the second wing section 24 and the third wing section 112. Due to the first coupling device 28 and the second coupling device 28 the wing sections 22, 24, 112 are able to form a C-configuration as depicted in FIG. 7.

An alternative description of one embodiment of the invention is provided in the following:

The purpose of the coupling device 28 is to hold an outer wing (second wing section 24) straight in normal operation ("flight position", see FIG. 2). That way very large wing spans and thus high fuel efficiency can be achieved. Very large wing spans require a structure of the wings that becomes very heavy in order to be able to carry the wing bending loads coming from maneuvers and gust all the way to the wing root. The solution presented here is that if a certain load level is exceeded (e.g. +2 g, i.e. twice the normal operation load), the coupling device 28 is released and the aerodynamic load rotates the wing upwards, so that the wing bending moment is reduced. One advantageous embodiment thereby is to place the rotation axis with an angle of several degrees with respect to the flight direction.

Same works for negative g-loads. Once the load level returns to normal (i.e. about 1 g), the reset function allows actively placing the outer wing back to flight position.

One additional advantage of the invention is that this actuation mechanism (e.g. the pump) also allows to rotate the outer wing to a vertical position at the gate in order to stay within a certain box, e.g. 80×80 meters.

In the following, the coupling device 28 which is also called nonlinear hydraulic system is described. Using a position sensor 106, the piston device 42 is set to a position so that the outer wing is straight. Both check valves 76, 94 are closed, and both pressure relief valves 60, 62 are also closed.

When a certain prescribed e.g. positive g-load is exceeded, the first pressure relief valve 60 opens, and allows the hydraulic fluid to flow from the right chamber (second portion 54) to the left chamber (first portion 52) (see FIG. 5). The hydraulic fluid thereby passes the first throttle valve 68, the design of which manifests the damping of the wing rotation. This damping may be chosen coherently with the overall aircraft design.

Once the wing bending load is reduced below the threshold by rotation of the second wing section 24, the first pressure relief valve 60 automatically closes by its own spring (preloading element 64). In order to move the second wing section 24 back into normal position, both check valves 76, 94 are opened, and hydraulic fluid is pumped from the left chamber (first portion 52) to the right chamber (second portion 54). This also works in the other direction for negative g-loads.

The coupling device 28 can be applied to a state-of-the-art wing/tube/empennage air-plane in order to achieve reduced fuel consumption by increased wing span while alleviating wing loads, and at the same time not exceed a certain gate size.

The coupling device 28 can also be applied to unconventional aircraft configurations such as flying wing (or Blended Wing Body (BWB)) aircraft 110. Then the purpose not only is to achieve a large wing span in cruise but also to better trim and stabilize the BWB aircraft during take-off and landing. The foldable winglets (second wing section 24 and third wing section 112) have a forward sweep in order to avoid moving the aerodynamic center rearwards in cruise.

Another embodiment is the application of the coupling device to a C-wing like configuration, see FIG. 7. BWB aircrafts 110 exhibit a nose-down pitching moment generated by landing flaps that can hardly be counterbalanced by the elevators 18 because no horizontal tail-plane exists on such tailless aircraft configurations. A C-wing like winglet can be used to provide large elevators for take-off and landing which can counterbalance the landing flaps pitch moment. In C-wing configuration (i.e. take-off, and landing configuration), the coupling device may be locked by an additional locking mechanism, i.e. no passive flight loads alleviation. In cruise, both the top wing (third wing section 112) and the side wing (second wing section 24) are folded in a horizontal position thus achieving a very large wing span. In cruise, the coupling device 28 is unlocked, and can fulfill its function of passive flight loads alleviation. The coupling device 28 is then applied either to the inner rotation axis, or to the outer rotation axis, or to both rotation axes (i.e. the inner and the outer one).

LIST OF REFERENCE 10 aircraft
12 wing
14 cockpit
16 jet engine
18 elevator
20 wing assembly
21 first component
22 first wing section
23 second component
24 second wing section
26 hinge
28 coupling device 30 first support element
32 second support element
34 first attachment portion
36 housing
38 first bearing
40 second attachment portion
42 piston device
44 rod
46 second bearing
48 rod opening
50 chamber
52 first portion
54 second portion
56 first fluid pathway
58 second fluid pathway
60 first pressure relief valve
62 second pressure relief valve
64 preloading element
66 blocking element
68 first throttle element
70 second throttle element
72 first opening
74 third fluid pathway
76 first check valve
78 first check valve blocking element
80 first check valve preloading element
82 first actuator
84 first shaft
86 first cam
88 first connecting element
90 second opening
92 fourth fluid pathway
94 second check valve
96 second check valve blocking element
98 second check valve preloading element
99 second actuator
100 second shaft
102 second cam
104 second connecting element
106 path sensor
108 measuring rod
110 aircraft
112 third wing section While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A coupling device for supporting a first component against a second component of an aircraft wherein the first component and the second component are movable relative to each other and exposed to aerodynamic loads, the coupling device being configured for passive flight load alleviation and comprising:
   a housing comprising a chamber, wherein the chamber comprises a first portion and a second portion and is filled with a fluid;
   a piston device movably arranged in the chamber, wherein the piston device separates the first portion from the second portion in a fluid tight manner, a first fluid pathway connecting the first portion to the second portion and defined by at least one wall of the housing;
   a first pressure relief valve arranged in the first fluid pathway, wherein the first pressure relief valve is configured to block the first fluid pathway, if the pressure in the second portion is smaller than a first relief pressure, and to open the first fluid pathway, if the pressure in the second portion is greater than the first relief pressure.

2. The coupling device according to claim 1, further comprising a first throttle element arranged in the first fluid pathway.

3. The coupling device according to claim 1, further comprising a second fluid pathway connecting the first portion to the second portion and defined by at least one wall of the housing,
   wherein a second pressure relief valve is arranged in the second fluid pathway, and
   wherein the second pressure relief valve is configured to block the second fluid pathway, if the pressure in the first portion is smaller than a second relief pressure and to open the second fluid pathway, if the pressure in the first portion is greater than the second relief pressure, and
   a second throttle element arranged in the first fluid pathway.

4. The coupling device according to claim 1, further comprising at least one of:
   at least two first pressure relief valves arranged in the first fluid pathway in parallel, wherein the first relief pressures of each of the first relief pressure valves differ and wherein each first pressure relief valve is configured to be remotely locked; and
   at least two second pressure relief valves arranged in the second fluid pathway in parallel, wherein the second relief pressures of each of the second relief pressure valves differ and wherein each second pressure relief valve is configured to be remotely locked.

5. The coupling device according to claim 3, further comprising at least one of:
   at least two first throttle elements arranged in the first fluid pathway in parallel, wherein each first throttle element is configured to be remotely blocked; and
   at least two second throttle elements arranged in the second fluid pathway in parallel, wherein each second throttle element is configured to be remotely blocked.

6. The coupling device according to claim 3, further comprising at least one of:
   a third fluid pathway connecting the first portion to a first opening and a first check valve arranged in the third pathway; and
   a fourth fluid pathway connecting the second portion to a second opening and a second check valve arranged in the fourth pathway.

7. The coupling device according to claim 6, further comprising at least one of:
   a first actuator configured to actuate the first check valve; and
   a second actuator configured to actuate the second check valve.

8. The coupling device according to claim 1, further comprising at least one of:
   a first attachment portion for attaching the housing to a first wing section; and
   a second attachment portion for attaching the piston to a second wing section, and
   a first bearing attached to a free end of the first attachment portion for rotatably attaching the first attachment portion to the first wing section; and
   a second bearing attached to a free end of the second attachment portion for rotatably attaching the second attachment portion to the second wing section.

9. The coupling device according to claim 1, further comprising a position sensor for measuring the position of the piston device in the chamber.

10. The coupling device according to claim 1, further comprising a fluid pump for pumping fluid to the third fluid pathway and/or the fourth fluid pathway.

11. A wing assembly for an aircraft, comprising
   a first wing section;
   a second wing section rotatably attached to the first wing section; and
   a coupling device supporting the second wing section with regard the first wing section, the coupling device comprising:
      a housing comprising a chamber, wherein the chamber comprises a first portion and a second portion and is filled with a fluid;
      a piston device movably arranged in the chamber, wherein the piston device separates the first portion from the second portion in a fluid tight manner, a first fluid pathway connecting the first portion to the second portion and defined by at least one wall of the housing;
      a first pressure relief valve arranged in the first fluid pathway, wherein the first pressure relief valve is configured to block the first fluid pathway, if the pressure in the second portion is smaller than a first relief pressure, and to open the first fluid pathway, if the pressure in the second portion is greater than the first relief pressure.

12. The wing assembly according to claim 11, further comprising at least one of:
   a first support element arranged at the first wing section for being connected to a first bearing; and
   a second support element arranged at the second wing section for being connected to a second bearing.

13. The wing assembly according to claim 11, further comprising at least one of:
   a first support element arranged at the first wing section for being connected to the first bearing;
   a second support element arranged at the second wing section for being connected to the second bearing;
   a third wing section rotatably attached to the second wing section; and
   a second coupling device supporting the third wing section with regard the second wing section.

14. An aircraft comprising at least one wing assembly-, the wing assembly comprising:
   a first wing section;
   a second wing section rotatably attached to the first wing section; and
   a coupling device supporting the second wing section with regard the first wing section, the coupling device comprising:
      a housing comprising a chamber, wherein the chamber comprises a first portion and a second portion and is filled with a fluid;
      a piston device movably arranged in the chamber, wherein the piston device separates the first portion from the second portion in a fluid tight manner, a first fluid pathway connecting the first portion to the second portion and defined by at least one wall of the housing;
      a first pressure relief valve arranged in the first fluid pathway, wherein the first pressure relief valve is configured to block the first fluid pathway, if the pressure in the second portion is smaller than a first relief pressure, and to open the first fluid pathway, if the pressure in the second portion is greater than the first relief pressure.

15. The aircraft according to claim 14, wherein the aircraft is a blended wing body aircraft.

* * * * *